United States Patent
Berry et al.

(10) Patent No.: US 9,212,822 B2
(45) Date of Patent: Dec. 15, 2015

(54) FUEL INJECTION ASSEMBLY FOR USE IN TURBINE ENGINES AND METHOD OF ASSEMBLING SAME

(75) Inventors: Jonathan Dwight Berry, Greenville, SC (US); Thomas Edward Johnson, Greer, SC (US); William David York, Greer, SC (US); Jong Ho Uhm, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 673 days.

(21) Appl. No.: 13/483,153

(22) Filed: May 30, 2012

(65) Prior Publication Data

US 2013/0318977 A1 Dec. 5, 2013

(51) Int. Cl.
*F02C 7/22* (2006.01)
*F23R 3/28* (2006.01)

(52) U.S. Cl.
CPC ............... *F23R 3/283* (2013.01); *F23R 3/286* (2013.01); *Y02E 20/14* (2013.01)

(58) Field of Classification Search
CPC .......... F02C 7/222; F02C 7/228; F02C 7/232; F02C 7/22; F02C 7/18; F23R 3/28; F23R 3/283; F23R 3/286; F23R 3/346; F23R 3/46
USPC ..................... 60/739, 261, 270, 742, 39.37
See application file for complete search history.

(56) References Cited

U.S. PATENT DOCUMENTS

| | | | |
|---|---|---|---|
| 5,372,008 A * | 12/1994 | Sood ............................... | 60/737 |
| 6,394,791 B2 | 5/2002 | Smith et al. | |
| 7,617,682 B2 | 11/2009 | Bruck | |
| 2004/0006993 A1* | 1/2004 | Stuttaford et al. .............. | 60/776 |
| 2009/0223227 A1 | 9/2009 | Lipinski et al. | |
| 2009/0255262 A1* | 10/2009 | McMasters et al. ............. | 60/742 |
| 2010/0008179 A1 | 1/2010 | Lacy et al. | |
| 2010/0095676 A1 | 4/2010 | Uhm et al. | |
| 2010/0180564 A1 | 7/2010 | Ziminsky et al. | |
| 2010/0186413 A1 | 7/2010 | Lacy et al. | |
| 2010/0192581 A1 | 8/2010 | Ziminsky et al. | |
| 2010/0218501 A1 | 9/2010 | York et al. | |
| 2010/0293955 A1 | 11/2010 | Berry et al. | |
| 2011/0005189 A1 | 1/2011 | Uhm et al. | |
| 2011/0179795 A1 | 7/2011 | Johnson et al. | |

* cited by examiner

*Primary Examiner* — Ehud Gartenberg
*Assistant Examiner* — Filippo Manfredi
(74) *Attorney, Agent, or Firm* — Armstrong Teasdale LLP (57) ABSTRACT

A fuel injection assembly for use in a turbine engine is provided. The fuel injection assembly includes an end cover, an endcap assembly, a fluid supply chamber, and a plurality of tube assemblies positioned at the endcap assembly. Each of the tube assemblies includes housing having a fuel plenum and a cooling fluid plenum. The cooling fluid plenum is positioned downstream from the fuel plenum and separated from the fuel plenum by an intermediate wall. The plurality of tube assemblies also include a plurality of tubes that extends through the housing. Each of the plurality of tubes is coupled in flow communication with the fluid supply chamber and a combustion chamber positioned downstream from the tube assembly. The plurality of tube assemblies further includes an aft plate at a downstream end of the cooling fluid plenum. The plate includes at least one aperture.

20 Claims, 7 Drawing Sheets

FUEL INJECTION ASSEMBLY FOR USE IN TURBINE ENGINES AND METHOD OF ASSEMBLING SAME

FEDERAL RESEARCH STATEMENT

This invention was made with Government support under Contract No. DE-FC26-05NT42643, awarded by the Department of Energy (DOE), and the Government has certain rights in this invention.

CROSS REFERENCE TO RELATED APPLICATIONS

This patent application relates to U.S. patent application Ser. No. 13/244,526 filed Sep. 25, 2011 , Ser. No. 13/343,417 filed Jan. 24, 2012 , Ser. No. 13/194,178 filed Jul. 29, 2011 , Ser. No. 13/194,465 filed Jul. 29, 2011 and Ser. No. 13/195,394 filed Aug. 1, 2011 , all of which are hereby incorporated by reference in their entirety.

BACKGROUND OF THE INVENTION

The subject matter disclosed herein generally relates to turbine engines and, more particularly, to a fuel injection assembly for use in turbine engines.

At least some known turbine engines are used in cogeneration facilities and power plants. Such engines may have high specific work and power per unit mass flow requirements. To increase the operating efficiency, at least some known turbine engines, such as gas turbine engines, may operate with increased combustion temperatures. Generally, in at least some known gas turbine engines, engine efficiency increases as combustion gas temperatures increase.

However, operating known turbine engines with higher temperatures may also increase the generation of polluting emissions, such as oxides of nitrogen ($NO_x$). In an attempt to reduce the generation of such emissions, at least some known turbine engines include improved combustion system designs. For example, many combustion systems may use premixing technology that includes tube assemblies or micromixers that facilitate mixing substances, such as diluents, gases, and/or air with fuel to generate a fuel mixture for combustion. Premixing technology may also allow hydrogen doping. In a hydrogen doping process, hydrogen gas ($H_2$) is mixed with fuel, prior to the fuel mixture being channeled to fuel nozzles. Hydrogen doping has been shown to reduce emission levels and helps reduce the likelihood of combustor lean blow out (LBO). However, the use of hydrogen doping may be limited.

In at least some known combustion systems, a downstream end and/or aft plate of a fuel injection assembly is exposed to a combustion chamber. Combustion of the fuel mixture in the combustion chamber may impart thermal strains on the downstream end and/or aft plate of the fuel injection assembly. Further, conduits and/or tubes within the fuel injection assembly used with hydrogen doping are also exposed to high temperatures. Over time, continued exposure to the high temperatures and thermal strains may damage and/or decrease the longevity of one or more components of the fuel injection assembly.

BRIEF DESCRIPTION OF THE INVENTION

In one aspect, a fuel injection assembly for use in a turbine engine is provided. The fuel injection assembly includes an end cover, an endcap assembly downstream from the end cover, a fluid supply chamber extending from the end cover to the endcap assembly, and a plurality of tube assemblies positioned at the endcap assembly. Each of the plurality of tube assemblies includes a housing having a fuel plenum and a cooling fluid plenum defined therein, the cooling fluid plenum downstream from the fuel plenum and separated therefrom by an intermediate wall, a plurality of tubes extending through the housing, each of the plurality of tubes in flow communication with the fluid supply chamber and a combustion chamber downstream from the tube assembly, and an aft plate at a downstream end of the cooling fluid plenum, the aft plate including at least one aperture defined therethrough to facilitate mixing fluids from the cooling fluid plenum and the plurality of tubes and at least one of cooling and maintaining a temperature of the aft plate. The fuel injection assembly further includes at least one fuel delivery pipe coupled to at least one of the plurality of tube assemblies for supplying fuel to the fuel plenum.

In another aspect, a system is provided. The system includes a turbine engine including an intake section, a compressor section coupled downstream from the intake section, a combustor section coupled downstream from the compressor section, a turbine section coupled downstream from the combustor section, and an exhaust section coupled downstream from the turbine section. The combuster section includes a combustion chamber, and a fuel injection assembly positioned with said combustion chamber. The fuel injection assembly includes an end cover, an endcap assembly downstream from the end cover, a fluid supply chamber extending from the end cover to the endcap assembly, and a plurality of tube assemblies positioned at the endcap assembly. Each of the plurality of tube assemblies includes a housing having a fuel plenum and a cooling fluid plenum defined therein, the cooling fluid plenum downstream from the fuel plenum and separated therefrom by an intermediate wall, a plurality of tubes extending through the housing, each of the plurality of tubes in flow communication with the fluid supply chamber and a combustion chamber downstream from the tube assembly, and an aft plate at a downstream end of the cooling fluid plenum, the aft plate including at least one aperture defined therethrough to facilitate mixing fluids from the cooling fluid plenum and the plurality of tubes and at least one of cooling and maintaining a temperature of the aft plate. The fuel injection assembly further includes at least one fuel delivery pipe coupled to at least one of the plurality of tube assemblies for supplying fuel to the fuel plenum.

In yet another aspect, a method for assembling a fuel injection assembly for use with a turbine engine is provided. The method includes providing an end cover and an endcap assembly downstream from the end cover, a fluid supply chamber extending between the end cover and the endcap assembly. The method further includes coupling a plurality of tube assemblies at the endcap assembly, wherein each of the plurality of tube assemblies includes a housing having a fuel plenum and a cooling fluid plenum defined therein, the cooling fluid plenum downstream from the fuel plenum and separated therefrom by an intermediate wall, a plurality of tubes extending through the housing, each of the plurality of tubes in flow communication with the fluid supply chamber and a combustion chamber downstream from the tube assembly, and an aft plate at a downstream end of the cooling fluid plenum, the aft plate including at least one aperture defined therethrough to facilitate mixing fluids from the cooling fluid plenum and the plurality of tubes and at least one of cooling and maintaining a temperature of the aft plate. The method further includes coupling at least one fuel delivery pipe to at least one of the plurality of tube assemblies to deliver fuel to the fuel plenum.

DETAILED DESCRIPTION OF THE INVENTION

The methods and systems described herein facilitate cooling one or more components in a fuel injection assembly. The fuel injection assembly includes a tube assembly that includes a housing having a fuel plenum and a cooling fluid plenum defined therein. An aft plate is positioned at a downstream end of the cooling fluid plenum and includes at least one aperture defined therein. A plurality of tubes extend through the housing. The cooling fluid plenum and the aft plate apertures enable cooling of the aft plate and/or the tubes in the fuel injection assembly, thus reducing thermal loading on the aft plate and the tubes, facilitating the prevention of damage, and increasing the longevity of the fuel injection assembly. In addition, swirl vanes or fins at outer walls of tube outlets enable secondary mixing of cooling fluid and fuel, reducing $NO_X$ emissions.

Figure 1:
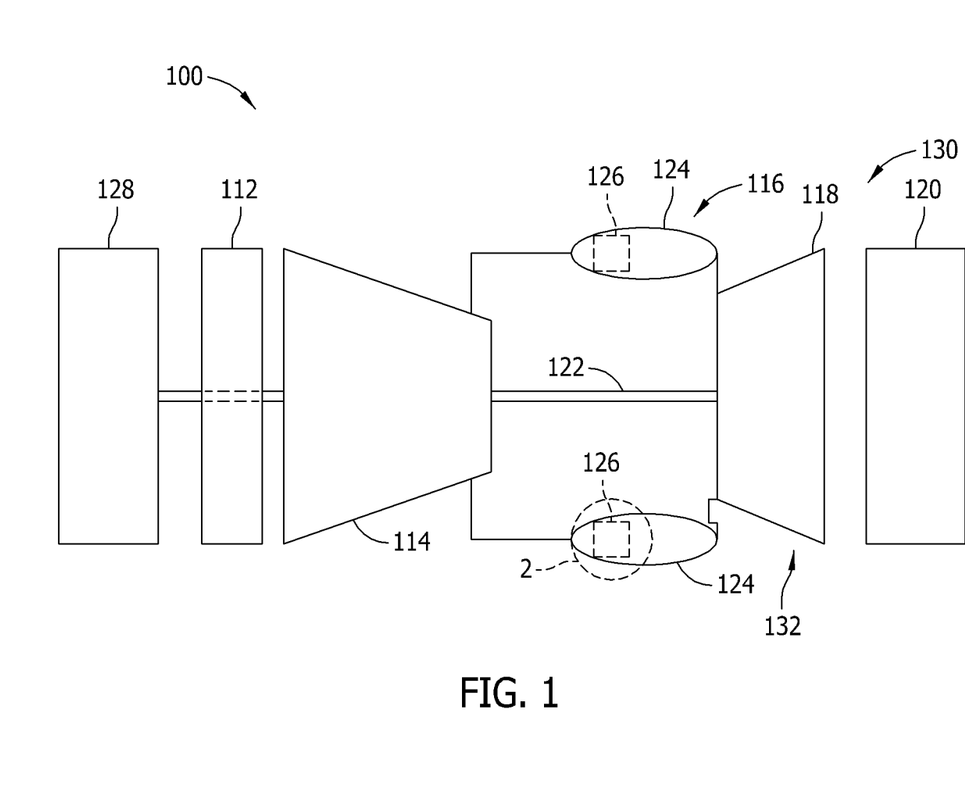
FIG. 1 is a schematic cross-sectional view of an exemplary turbine engine.

FIG. 1 is a schematic cross-sectional view of an exemplary turbine engine 100. More specifically, turbine engine 100 is a gas turbine engine. While the exemplary embodiment includes a gas turbine engine, the present invention is not limited to any one particular engine, and one of ordinary skill in the art will appreciate that the current invention may be used in connection with other turbine engines.

In the exemplary embodiment, turbine engine 100 includes an intake section 112, a compressor section 114 coupled downstream from intake section 112, a combustor section 116 coupled downstream from compressor section 114, a turbine section 118 coupled downstream from combustor section 116, and an exhaust section 120. Turbine section 118 is coupled to compressor section 114 via a rotor shaft 122. In the exemplary embodiment, combustor section 116 includes a plurality of combustors 124. Combustor section 116 is coupled to compressor section 114 such that each combustor 124 is in flow communication with compressor section 114. A fuel injection assembly 126 is coupled within each combustor 124. Turbine section 118 is coupled to compressor section 114 and to a load 128 such as, but not limited to, an electrical generator and/or a mechanical drive application. In the exemplary embodiment, each compressor section 114 and turbine section 118 includes at least one rotor disk assembly 130 that is coupled to a rotor shaft 122 to form a rotor assembly 132.

During operation, intake section 112 channels air towards compressor section 114 wherein the air is compressed to a higher pressure and temperature prior to being discharged towards combustor section 116. The compressed air is mixed with fuel and other fluids that are provided by each fuel injection assembly 126 and ignited to generate combustion gases that are channeled towards turbine section 118. More specifically, each fuel injection assembly 126 injects fuel, such as natural gas and/or fuel oil, air, diluents, and/or inert gases, such as Nitrogen gas ($N_2$), into respective combustors 124, and into the air flow. The fuel mixture is ignited to generate high temperature combustion gases that are channeled towards turbine section 118. Turbine section 118 converts the thermal energy from the gas stream to mechanical rotational energy, as the combustion gases impart rotational energy to turbine section 118 and to rotor assembly 132. Because fuel injection assembly 126 injects the fuel with air, diluents, and/or inert gases, NOx emissions may be reduced within each combustor 124.

Figure 2:
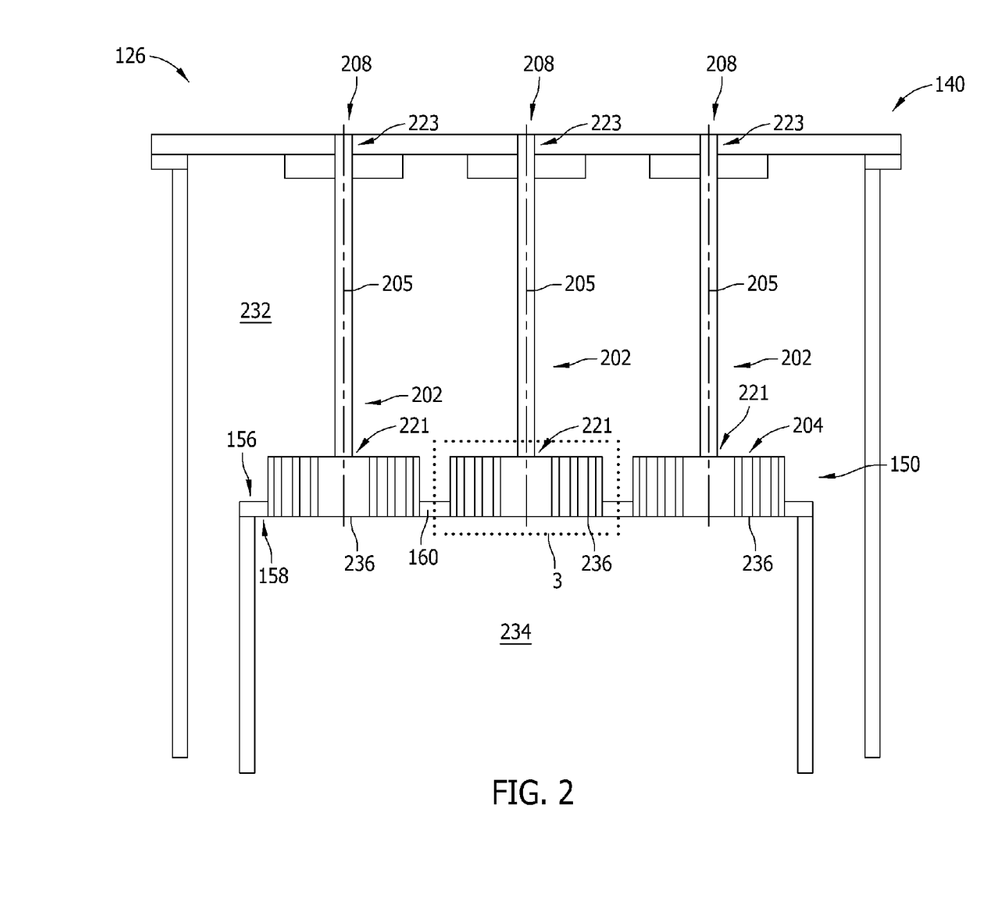
FIG. 2 is a schematic cross-sectional view of a portion of an exemplary fuel injection assembly used with the turbine engine shown in FIG. 1.

FIG. 2 is a cross-sectional view of a portion of fuel injection assembly 126 and taken along area 2 (shown in FIG. 1). In the exemplary embodiment, fuel injection assembly 126 extends from an end cover 140 of combustor 124 (shown in FIG. 1). An endcap assembly 150 is downstream from end cover 140 and includes an upstream portion 156 and a downstream portion 158. In the exemplary embodiment, endcap assembly 150 includes an end plate 160, and a plurality of tube assemblies 202 are coupled to end plate 160. Alternatively, in some embodiments, endcap assembly 150 does not include an end plate 160, and each tube assembly 202 is coupled to an adjacent tube assembly 202. In the exemplary embodiment, tube assemblies 202 are generally cylindrical. Alternatively, tube assemblies 202 may have any other shape and/or size that enables fuel injection assembly 126 and/or turbine engine 100 to function as described herein.

In the exemplary embodiment, tube assemblies 202 are fuel injection nozzles that extend substantially axially to end plate 160. Each tube assembly 202 includes a plurality of non-coaxial tubes 204 and has a longitudinal axis 205. Tube assemblies 202 are formed integrally with end plate 160 in the exemplary embodiment. Alternatively, each tube assembly 202 may be coupled to adjacent tube assemblies 202. In the exemplary embodiment, each tube 204 discharges a mixture of fuel, air, and other fluids through a passage (not shown in FIG. 2) defined within each tube 204.

In the exemplary embodiment, fuel injection assembly 126 may include three tube assemblies 202, as shown in FIG. 2. Alternatively, fuel injection assembly 126 includes any number of tube assemblies 202 that enable fuel injection assembly 126 to function as described herein. A fuel delivery pipe 208 includes a first end portion 221 that is coupled to tube assembly 202, and a second end portion 223 that is coupled to a fuel source (not shown). In the exemplary embodiment, fuel delivery pipe 208 is generally cylindrical. Alternatively, fuel delivery pipe 208 may have any other shape and/or size that enables fuel injection assembly 126 and/or turbine engine 100 to function as described herein.

Tube assemblies 202 extend through a fluid supply chamber 232 that supplies a fluid to each tube assembly 202. In the exemplary embodiment, fluid supply chamber 232 supplies air to tube assembly 202. Alternatively, fluid supply chamber 232 may supply any fluid to tubes 204 that enables tube assembly 202 to function as described herein. Fuel is injected into tubes 204 and is mixed with the air in tubes 204. The fuel/air mixture exits tubes 204 at downstream portion 158 and is combusted in a combustion chamber 234. At downstream portion 158, tube assemblies 202 each include an aft plate 236, as is described in more detail below.

Figure 3:
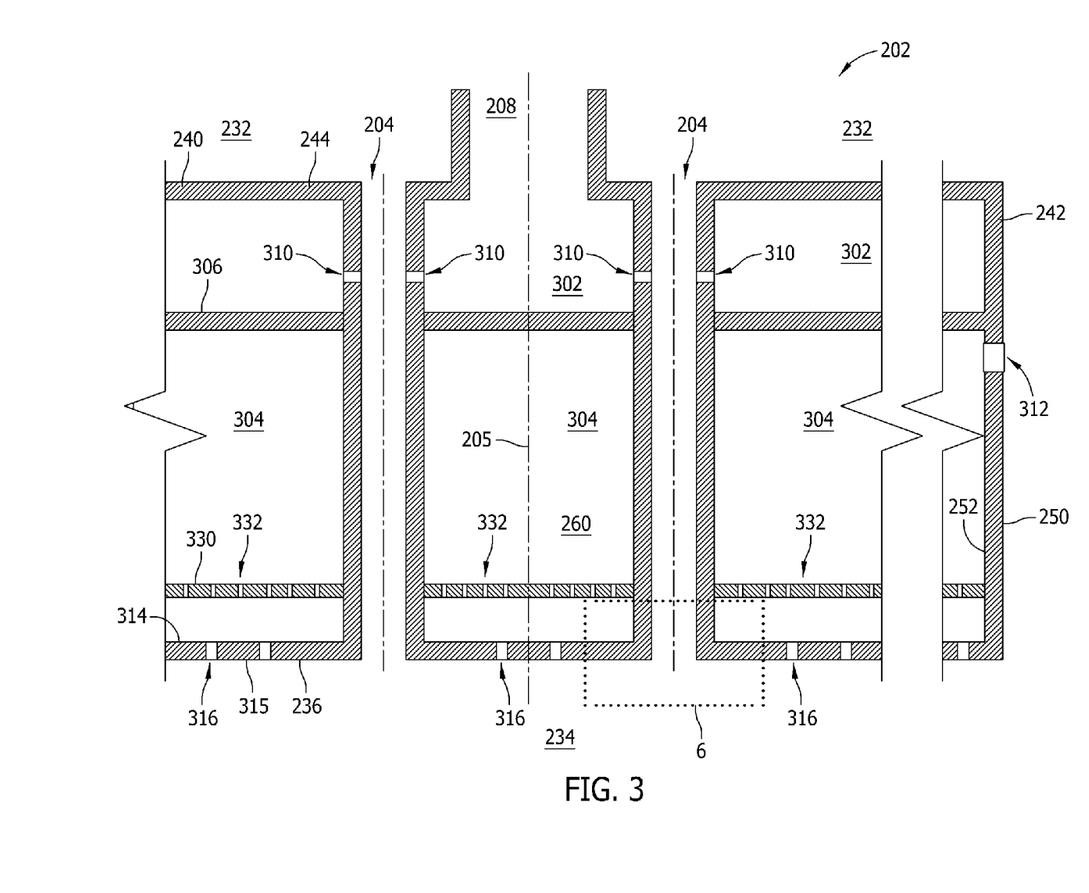
FIG. 3 is an enlarged schematic cross-sectional view of a portion of an exemplary tube assembly that may be used with the fuel injection assembly shown in FIG. 2.

FIG. 3 is an enlarged schematic cross-sectional view of a portion of tube assembly 202 taken along area 3 (shown in FIG. 2). In the exemplary embodiment, each tube assembly 202 includes a housing 240. Housing 240 includes a sidewall 242 that extends between a forward endwall 244 and aft plate 236. Aft plate 236 is oriented between forward endwall 244 and combustion chamber 234. In the exemplary embodiment, aft plate 236 forms a portion of end plate 160 (shown in FIG. 2). Alternatively, in embodiments that do not include end plate 160, each tube assembly 202 includes a separate aft plate 236 at endcap assembly 150. Sidewall 242 includes a radially outer surface 250 and a radially inner surface 252. Radially inner surface 252 defines a substantially cylindrical cavity 260 that extends along longitudinal axis 205 and between forward endwall 244 and aft plate 236.

Tube assembly 202 includes a fuel plenum 302 and a cooling fluid plenum 304 that is downstream from fuel plenum 302. Fuel plenum 302 and cooling fluid plenum 304 are separated by an intermediate wall 306. Tubes 204 extend through fuel plenum 302 and cooling fluid plenum 304 to aft plate 236.

For clarity, in the exemplary embodiment, only two tubes 204 are shown. However, tube assembly 202 may include any number of tubes 204 that enables tube assembly 202 to function as described herein. Moreover, in the exemplary embodiment, tubes 204 are generally have a circular cross-section. Alternatively, tubes 204 may have any other shape and/or size that enables tube assembly 202 to function as described herein.

In operation, fuel flows into fuel plenum 302 from fuel delivery pipe 208. Fuel inlet apertures 310 defined in tubes 204 enable fuel from fuel plenum 302 to mix with air in tubes 204. In the exemplary embodiment, cooling fluid plenum 304 is an air plenum and the cooling fluid is air. Cooling fluid plenum 304 includes a plurality of cooling fluid inlets 312 defined in sidewall 242 that are in fluid communication with fluid supply chamber 232, such that air discharged from inlets 312 enters cooling fluid plenum 304. The air in cooling fluid plenum 304 facilitates cooling aft plate 236 and a tube outlet into combustion chamber 234. Alternatively, cooling fluid plenum 304 may supply any fluid to tubes 204 that enables tube assembly 202 to function as described herein. More specifically, aft plate includes an interior surface 314 and exterior surface 315. Exterior surface 315 at least partially defines combustion chamber 234. Air discharged from inlets 312 into cooling fluid plenum 304 impinges against an interior surface 314 of aft plate 236. In the exemplary embodiment, a plurality of effusion holes 316 are defined in aft plate 236. More specifically, in the exemplary embodiment, effusion holes 316 are each oriented to discharge air in a direction substantially orthogonal to plate interior surface 314 and substantially parallel to longitudinal axis 205. Alternatively, effusion holes 316 may have any orientation that enables tube assembly 202 to function as described herein. Air flows from cooling fluid plenum 304 through effusion holes 316 to combustion chamber 234, to facilitate additional cooling of aft plate 236.

In the exemplary embodiment, tube assembly 202 includes an impingement plate 330 upstream from aft plate 236. Impingement plate 330 is positioned within cooling fluid plenum 304. A plurality of impingement holes 332 extend through impingement plate 330. Cooling fluid discharged from cooling fluid plenum 304 flows through impingement holes 332 to form jets of cooling fluid that impinge against aft plate 236. The cooling fluid jets facilitate cooling aft plate 236. In the exemplary embodiment, impingement holes 332 are each oriented to discharge air in a direction substantially orthogonal to an impingement plate surface 334 and substantially parallel to longitudinal axis 205. Alternatively, impingement holes 332 may have any orientation that enables tube assembly 202 to function as described herein.

Figure 4:
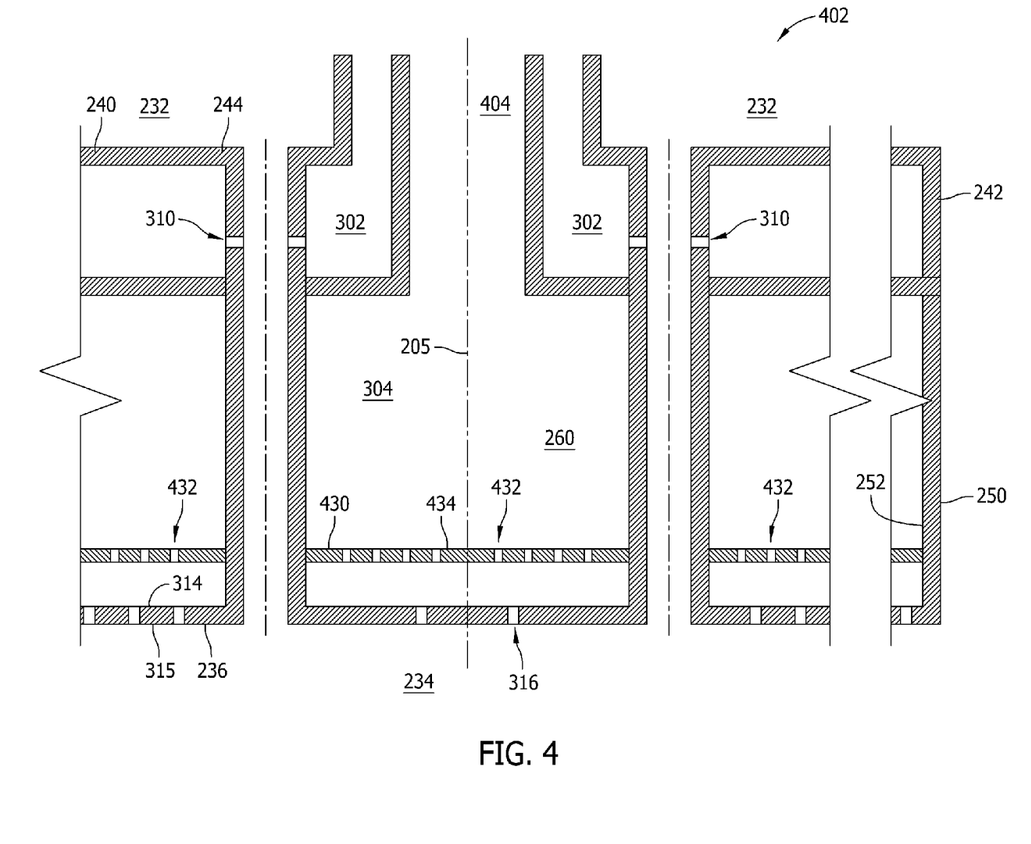
FIG. 4 is a schematic cross-sectional view of a portion of an alternative tube assembly that may be used with the fuel injection assembly shown in FIG. 2.

FIG. 4 is a schematic cross-sectional view of a portion of an alternative tube assembly 402 that may be used with fuel injection assembly 126 (shown in FIG. 2). Unless otherwise specified, tube assembly 402 is substantially similar to tube assembly 202 (shown in FIG. 3), and similar components are labeled in FIG. 4 with the same reference numerals used in FIG. 3. Tube assembly 402 includes a cooling fluid supply conduit 404 in communication with cooling fluid plenum 304. Cooling fluid is supplied to cooling fluid plenum 304 through cooling fluid supply conduit 404 from a cooling fluid source (not shown). In the exemplary embodiment, cooling fluid supply conduit 404 supplies nitrogen gas to cooling fluid plenum 304. Alternatively, cooling fluid supply conduit 404 may supply any fluid to cooling fluid plenum 304 that enables tube assembly 402 to function as described herein.

Similar to tube assembly 202, tube assembly 402 includes an impingement plate 430 having a plurality of impingement holes 432 extending therethrough. In the exemplary embodiment, impingement holes 432 are oriented substantially orthogonally with respect to a surface 434 of impingement plate 430 and longitudinal axis 205. Alternatively, impingement holes 432 may have any orientation that enables tube assembly 402 to function as described herein.

Figure 5:
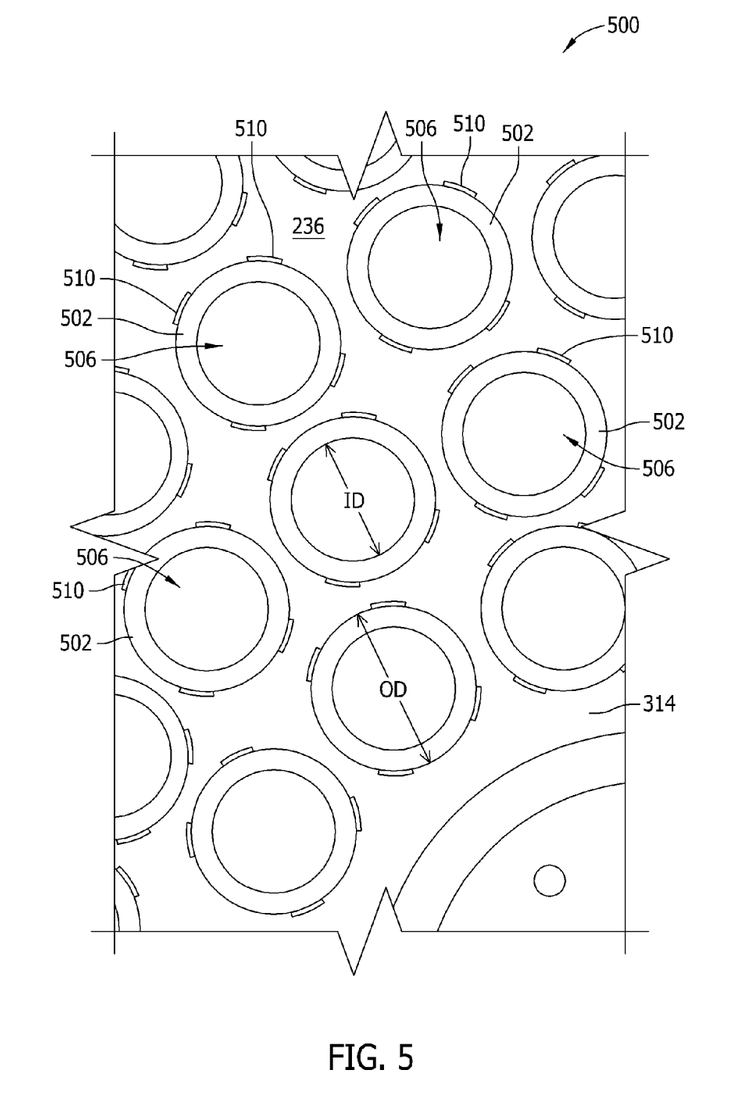
FIG. 5 is a plan view of a portion of an exemplary tube assembly that may be used with the fuel injection assembly shown in FIG. 2.

FIG. 5 is a plan view of a portion of an exemplary tube assembly 500 that may be used with the fuel injection assembly shown in FIG. 2. Tube assembly 500 includes a plurality of tubes 502, similar to tubes 204 (shown in FIG. 3). In the exemplary embodiment, each tube 502 includes an outlet 506 at aft plate 236 (shown in FIG. 3). Each tube 502 has an inner diameter, ID, and an outer diameter, OD. In the embodiment shown in FIG. 5, four slots 510 are arranged circumferentially around each outlet 506. Slots 510 are formed outside outer diameter OD of each tube 502. Alternatively, any number of slots 510 may be arranged around each outlet 506. For example, in the embodiment shown in FIGS. 6 and 7 (described below), one continuous slot circumscribes a tube outlet.

Slots 510 provide fluid communication between cooling fluid plenum 304 and combustion chamber 234 (both shown in FIG. 3). Accordingly, slots 510 facilitate cooling aft plate 236 and tube outlets 506. Slots 510 also facilitate mixing cooling fluid from cooling fluid plenum 304 with the fuel/air mixture from tubes 502, which may reduce NOx emissions.

Figure 6:
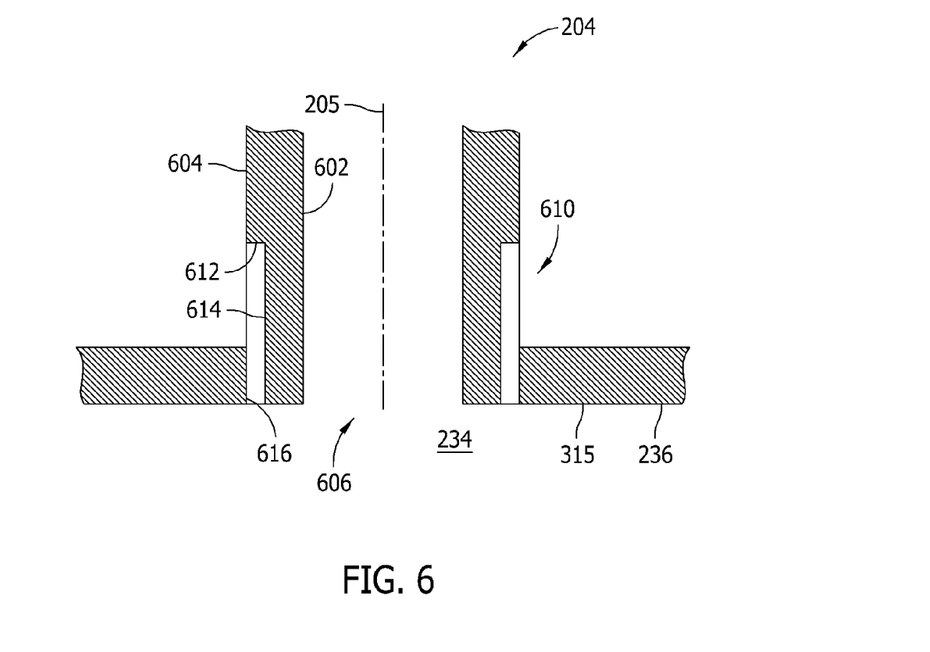
FIG. 6 is an enlarged schematic cross-sectional view of a portion of an exemplary tube that may be used with the tube assembly shown in FIG. 3.

FIG. 6 is an enlarged schematic cross-sectional view of a portion of tube 204 taken along area 6 (shown in FIG. 3). In the exemplary embodiment, tube 204 includes an inner wall 602, an outer wall 604, and an outlet 606 through which the fuel/air mixture is discharged from tube 204 and into combustion chamber 234. Outlet 606 is substantially flush with exterior surface 315 of aft plate 236. Similar to tube 500 (shown in FIG. 5), tube 204 includes has an inner diameter, ID, and an outer diameter, OD.

A cooling fluid passage 610 is defined in tube outer wall 604 and circumscribes tube 204. Cooling fluid passage 610 is defined by a ledge 612 and a passage wall 614. Moreover, at aft plate 236, cooling fluid passage 610 is defined between passage wall 614 and a wall 616 of aft plate 236. In the exemplary embodiment, cooling fluid passage 610 is substantially annular with any configuration that enables tube 204 to function as described herein. Cooling fluid passage 610 provides fluid communication between cooling fluid plenum 304 and combustion chamber 234 to facilitate cooling aft plate 236 and tube outlet 606 and to facilitate mixing of cooling fluid from cooling fluid passage 610 and the fuel/air mixture from tube 204, which may reduce NOx emissions.

Figure 7:
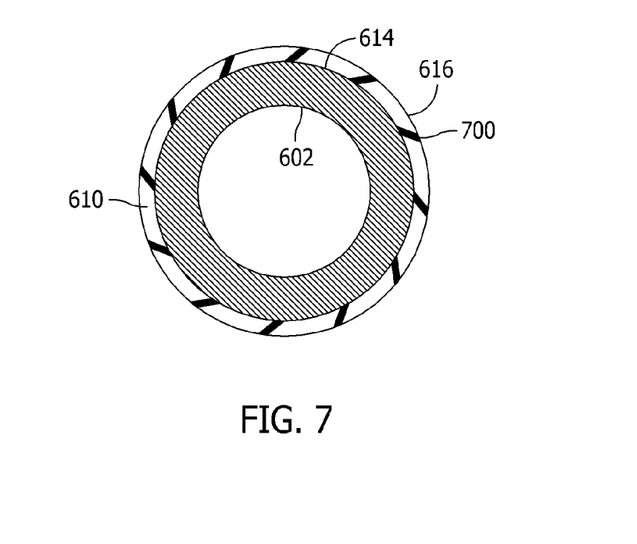
FIG. 7 is a plan view of the tube shown in FIG. 6.

FIG. 7 is a plan view of tube 204 shown in FIG. 6. As shown in FIG. 7, in the exemplary embodiment, cooling fluid passage 610 includes a plurality of vanes 700 that extend from passage wall 614 to aft plate wall 616. Accordingly, in the exemplary embodiment, vanes 700 are positioned within outer diameter OD of tube 204. Alternatively, cooling fluid passage 610 and vanes 700 may be positioned outside outer diameter OD of tube 204. For example, slots 510 (shown in FIG. 5) may include vanes therein. In the exemplary embodiment, twelve vanes 700 are illustrated. Alternatively, cooling fluid passage 610 may include any number of vanes 700 that enable tube assembly 202 to function as described herein. In the exemplary embodiment, vanes 700 are all oriented obliquely with respect to passage wall 614 and aft plate wall 616. Alternatively, vanes 700 may have any shape and/or orientation that enables tube assembly 202 to function as described herein. For example, in one embodiment, at least some vanes 700 may be oriented differently than the remaining vanes. Further, in some embodiments, vanes 700 may have an angled shape or a helical shape.

In the exemplary embodiment, vanes 700 are manufactured by modifying outer wall 604 of tube 204 or aft plate wall 616. Alternatively, vanes 700 are coupled to passage wall 614 and/or aft plate wall 616 using any suitable coupling method. Moreover, in one embodiment, vanes 700 may also be formed integrally with passage wall 614 and/or aft plate wall 616. In operation, cooling fluid from cooling fluid plenum 304 flows through cooling fluid passage 610 into combustion chamber 234. Vanes 700 induce a swirling pattern in cooling fluid at outlet 606 that facilitates cooling tube 204 and aft plate 236 and mixing cooling fluid from cooling fluid passage 610 and the fuel/air mixture from tube 204, which may reduce NOx emissions.

Figure 8:
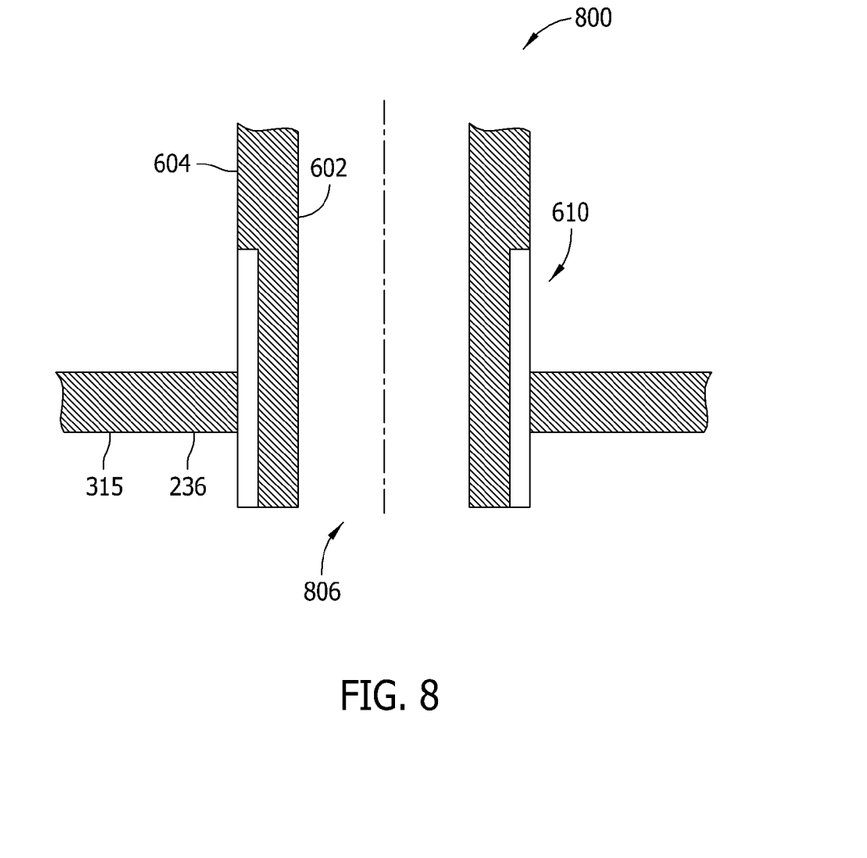
FIG. 8 is a schematic cross-sectional view of a portion of an alternative tube that may be used with the tube assembly shown in FIG. 3.

FIG. 8 is a schematic cross-sectional view of a portion of an alternative tube 800 that may be used with tube assembly 202 (shown in FIG. 3). Unless otherwise specified, tube 800 is substantially similar to tube 204 (shown in FIGS. 6 and 7), and similar components are labeled in FIG. 8 with the same reference numerals used in FIG. 6. In the embodiment shown in FIG. 8, an outlet 806 of tube 800 extends outward a distance beyond exterior surface 315 of aft plate 236. The extension of tube 800 beyond exterior surface 315 and with cooling fluid passage 610 facilitates reducing a temperature of aft plate 236 and tube 204 and reducing NOx.

As compared to known fuel injection and cooling systems that are used with turbine engines, the above-described fuel injection assembly may be used with turbine engines to facilitate enhanced cooling of components of the fuel injection assembly. The fuel injection assembly includes at least one tube assembly that includes a fuel plenum and a cooling fluid plenum that is downstream from the fuel plenum. The tube assembly also includes an aft plate at a downstream end of the cooling fluid plenum. At least one aperture defined in the aft plate enables a cooling fluid to be channeled therethrough from the cooling fluid plenum to facilitate cooling the aft plate and/or tubes within the tube assembly. In addition, swirl vanes or fins at tube outlets enable secondary mixing of cooling fluid and fuel, reducing $NO_X$ emissions.

Exemplary embodiments of a fuel injection assembly and method of assembling the same are described above in detail. The fuel injection assembly is not limited to the specific embodiments described herein, but rather, components of the fuel injection assembly and/or steps of the injection assembly may be utilized independently and separately from other components and/or steps described herein. For example, the fuel injection assembly may also be used in combination with other machines and methods, and is not limited to practice with only a turbine engine as described herein. Rather, the exemplary embodiment can be implemented and utilized in connection with many other systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fuel injection assembly for use in a turbine engine, said fuel injection assembly comprising:
    an end cover;
    an endcap assembly comprising an aft plate downstream from said end cover;
    a fluid supply chamber extending from said end cover to said endcap assembly;
    a plurality of tube assemblies positioned at said endcap assembly, each of said plurality of tube assemblies comprising:
        a housing having a fuel plenum and a cooling fluid plenum defined therein, said cooling fluid plenum downstream from said fuel plenum and separated therefrom by an intermediate wall;
        a plurality of non-coaxial tubes extending through said housing from said fluid supply chamber into a combustion chamber downstream from said tube assembly a predetermined distance, at least one of said plurality of tubes comprising a first outer diameter along a first length of said tube and a second outer diameter, the second outer diameter extending along said tube from said fluid supply chamber upstream of said aft plate, through an aperture defined in said aft plate, to a combustion chamber downstream of said end plate, the second outer diameter being less than the first outer diameter and defining a passage through said aft plate between each tube of the plurality of non-coaxial tubes and said aft plate from the cooling fluid plenum to the combustion chamber; and
    at least one fuel delivery pipe coupled to at least one of said plurality of tube assemblies for supplying fuel to said fuel plenum.

2. A fuel injection assembly in accordance with claim 1, wherein at least one inlet is defined in a sidewall of said housing, said at least one inlet providing flow communication between said fluid supply chamber and said cooling fluid plenum.

3. A fuel injection assembly in accordance with claim 1, wherein each of said plurality of tube assemblies further comprises an impingement plate positioned within said cooling fluid plenum and comprising a plurality of impingement holes defined therein.

4. A fuel injection assembly in accordance with claim 1, wherein said endcap assembly comprises an end plate, and wherein said aft plate forms a portion of said end plate.

5. A fuel injection assembly in accordance with claim 1, wherein each of said plurality of tubes comprises an outlet defined in said aft plate, said at least one aperture comprises a cooling fluid passage adjacent said outlet to facilitate at least one of cooling and maintaining a temperature of said outlet.

6. A fuel injection assembly in accordance with claim 5, wherein a plurality of vanes extend through said cooling fluid passage between an outer wall of said tube and a wall of said aft plate, wherein each of said plurality of vanes has at least one of an angled and a helical shape.

7. A fuel injection assembly in accordance with claim 1, wherein said fuel injection assembly further comprises a cooling fluid supply conduit configured to channel cooling fluid into said cooling fluid plenum.

8. A fuel injection assembly in accordance with claim 1, wherein each of said plurality of tubes comprises at least one inlet providing flow communication between said tube and said fuel plenum.

9. A combustor assembly for use with a turbine engine, said combustor assembly comprising:
   a combustion chamber; and
   a fuel injection assembly positioned with said combustion chamber, said fuel injection assembly comprising:
      an end cover;
      an endcap assembly comprising an aft plate downstream from said end cover;
      a fluid supply chamber extending from said end cover to said endcap assembly;
      a plurality of tube assemblies positioned at said endcap assembly, each of said plurality of tube assemblies comprising:
         a housing having a fuel plenum and a cooling fluid plenum defined therein, said cooling fluid plenum downstream from said fuel plenum and separated therefrom by an intermediate wall;
         a plurality of tubes extending through said housing,-from said fluid supply chamber into a combustion chamber downstream from said tube assembly a predetermined distance, at least one of said plurality of tubes comprising a first outer diameter along a first length of said tube and a second outer diameter, the second outer diameter extending along said tube from said fluid supply chamber upstream of said aft plate, through an aperture defined in said aft plate, to a combustion chamber downstream of said end plate, the second outer diameter being less than the first outer diameter to form a passage of cooling fluid through said aft plate between each tube of the plurality of tubes and said aft plate from the cooling fluid plenum to the combustion chamber; and
      at least one fuel delivery pipe coupled to at least one of said plurality of tube assemblies for supplying fuel to said fuel plenum.

10. A combustor assembly in accordance with claim 9, wherein at least one inlet is defined in a sidewall of said housing, said at least one inlet providing flow communication between said fluid supply chamber and said cooling fluid plenum.

11. A combustor assembly in accordance with claim 9 further comprising an impingement plate positioned within said cooling fluid plenum and comprising a plurality of impingement holes defined therein.

12. A combustor assembly in accordance with claim 9, wherein said aft plate forms a portion of an end plate that couples said plurality of tube assemblies to one another.

13. A combustor assembly in accordance with claim 9, wherein each of said plurality of tubes comprises an outlet defined in said aft plate, said at least one aperture comprises a cooling fluid passage adjacent said outlet to facilitate at least one of cooling and maintaining a temperature of said outlet.

14. A combustor assembly in accordance with claim 13, wherein a plurality of vanes extend through said cooling fluid passage between an outer wall of said tube and a wall of said aft plate, wherein each of said plurality of vanes has at least one of an angled and a helical shape.

15. A combustor assembly in accordance with claim 13, wherein said outlet extends outward a distance beyond said plate.

16. A method for assembling a fuel injection assembly for use with a turbine engine, said method comprising:
   providing an end cover and an endcap assembly including an aft plate downstream from the end cover, a fluid supply chamber extending between the end cover and the endcap assembly;
   coupling a plurality of non-coaxial tube assemblies at the endcap assembly, wherein each of the plurality of tube assemblies includes a housing having a fuel plenum and a cooling fluid plenum defined therein, the cooling fluid plenum downstream from the fuel plenum and separated therefrom by an intermediate wall, a plurality of tubes extending through said housing from said fluid supply chamber into a combustion chamber downstream from said tube assembly a predetermined distance, at least one of said plurality of tubes comprising a first outer diameter along a first length of said tube and a second outer diameter, the second outer diameter extending along said tube from said cooling fluid plenum upstream of said aft plate, through an aperture defined in said aft plate, to a combustion chamber downstream of said end plate, the second outer diameter being less than the first outer diameter; and
   coupling at least one fuel delivery pipe to at least one of the plurality of tube assemblies to deliver fuel to the fuel plenum.

17. A method in accordance with claim 16, wherein coupling a plurality of tube assemblies comprises coupling a plurality of tube assemblies wherein at least one inlet is defined in a sidewall of the housing, the at least one inlet providing flow communication between the fluid supply chamber and the cooling fluid plenum.

18. A method in accordance with claim 16, wherein coupling a plurality of tube assemblies comprises coupling a plurality of tube assemblies that each include an impingement plate within the cooling fluid plenum and including a plurality of impingement holes defined therein.

19. A method in accordance with claim 16, wherein coupling a plurality of tube assemblies comprises coupling a plurality of tube assemblies wherein each of the plurality of tubes includes an outlet defined in the aft plate, the at least one aperture includes a cooling fluid passage adjacent the outlet to facilitate at least one of cooling and maintaining a temperature of the outlet.

20. A method in accordance with claim 19, wherein coupling a plurality of tube assemblies comprises coupling a plurality of tube assemblies wherein each of the plurality of tubes further includes a plurality of vanes extending through the cooling fluid passage between an outer wall of the tube and a wall of the aft plate, wherein each of the plurality of vanes has at least one of an angled and a helical shape.

* * * * *